United States Patent
Poisel et al.

[11] Patent Number: 6,043,916
[45] Date of Patent: Mar. 28, 2000

[54] SYSTEM FOR TRANSMITTING AND RECEIVING SIGNALS ALONG A CIRCULAR PATH

[75] Inventors: Hans Poisel, Leinburg; Georg Kodl, Nürnberg; Erhan Dandin, Erlangen, all of Germany

[73] Assignee: Schleifring und Apparatebau GmbH, Furstenfeldbruck, Germany

[21] Appl. No.: 08/750,991
[22] PCT Filed: Oct. 21, 1994
[86] PCT No.: PCT/EP94/03464
§ 371 Date: Dec. 23, 1996
§ 102(e) Date: Dec. 23, 1996
[87] PCT Pub. No.: WO95/35605
PCT Pub. Date: Dec. 28, 1995

[30] Foreign Application Priority Data

Jun. 21, 1994 [DE] Germany ............... P442161605

[51] Int. Cl.⁷ .................................. H04B 10/00
[52] U.S. Cl. .............. 359/156; 250/551; 359/124; 359/144; 359/159; 370/278; 370/534; 378/15
[58] Field of Search .................. 359/156, 159, 359/144; 370/534, 278; 250/551; 378/4, 6, 7, 11, 14, 15, 19

[56] References Cited

U.S. PATENT DOCUMENTS

| | | | |
|---|---|---|---|
| 4,179,619 | 12/1979 | Cook | 250/551 |
| 4,555,631 | 11/1985 | Martens | 359/159 |
| 4,962,495 | 10/1990 | Gibbons et al. | 359/144 |
| 5,134,513 | 7/1992 | Vekstein et al. | 378/15 |
| 5,164,972 | 11/1992 | Krumme | 370/534 |
| 5,363,463 | 11/1994 | Kleinerman | 359/124 |
| 5,469,488 | 11/1995 | Ono | 378/15 |
| 5,535,033 | 7/1996 | Guempelein | 359/144 |
| 5,577,026 | 11/1996 | Gordon et al. | 370/278 |

FOREIGN PATENT DOCUMENTS

| | | |
|---|---|---|
| 0381786 | 8/1990 | European Pat. Off. . |
| 0481103 | 4/1992 | European Pat. Off. . |
| 2514918 | 4/1983 | France . |
| 2441359 | 3/1976 | Germany . |
| 2037979 | 7/1980 | United Kingdom ........ 378/15 |

OTHER PUBLICATIONS

Patent Abstracts of Japan, vol. 15, No. 278, Jul. 15, 1991 and JP,A,03094206 (Agency of Ind Science & Tech), Apr. 19, 1991.

*Primary Examiner*—Jeffery A. Hofsass
*Assistant Examiner*—John Tweel, Jr.
*Attorney, Agent, or Firm*—Jacobson, Price, Holman & Stern, PLLC

[57] ABSTRACT

An apparatus for sending and receiving light signals representing measurement information, such as used in conjunction with a medical examination apparatus. The medical examination device has a rotating sender support with a sender device for transmitting the signal light. The sender device is positionally fixed on the sender support so as to rotate in a circular path defined by the rotating support. A stationary detecting receiver device is disposed on a circle that is parallelly aligned with the circular path over which the sender is rotated. The receiver device is disposed at a distance from the sender. A single sender device is used to transmit the informational signals. The receiver device is a fluorescing fiber-optic fiber which extends within a circular ring configuration and has at least one detector mounted at or near at least one of the fiber. The detector detects the informational signals received by the fiber. The sender emits the informational signals to the fluorescing fiber-optic fiber at an angle which is approximately perpendicular to the central axis of the fiber.

12 Claims, 1 Drawing Sheet

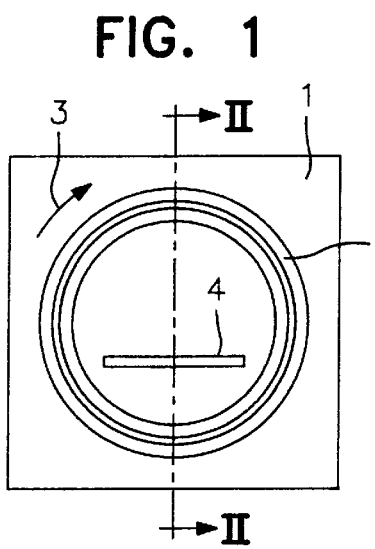
FIG. 1
FIG. 2
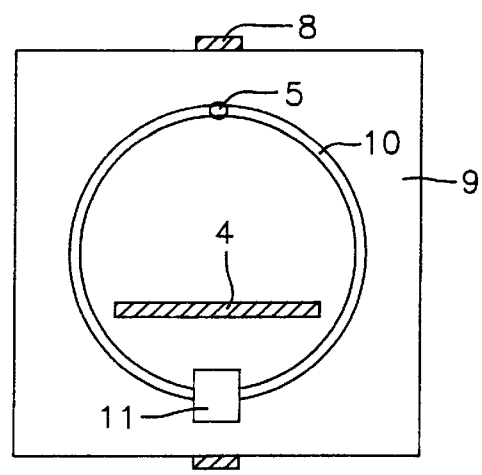
FIG. 3
FIG. 4
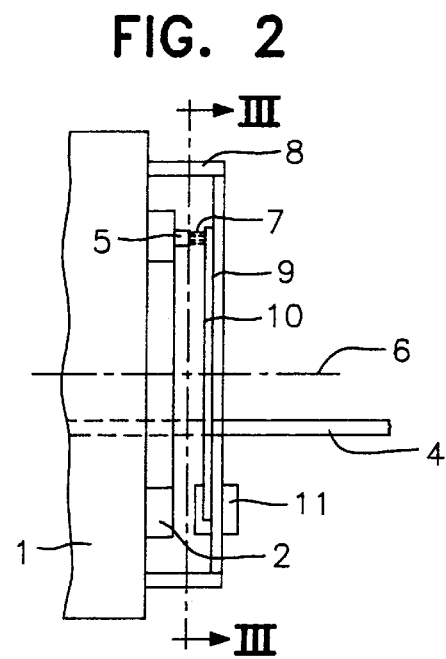
FIG. 5

SYSTEM FOR TRANSMITTING AND RECEIVING SIGNALS ALONG A CIRCULAR PATH

BACKGROUND OF THE INVENTION

1. Field of the Invention

The present invention relates to an apparatus for sending and receiving light signals representing information. More particularly, the present invention relates to an apparatus for sending and receiving light signals along a circular path.

2. Description of the Related Art

The invention relates to an apparatus for sending and receiving light signals along a circular path. Rotating light signals are provided, e.g., as part of a telemetering apparatus for medical examination or research purposes. The light signals represent measurement information. Telemetering devices typically comprise a rotating sender support with a plurality sender devices for transmitting signal light, and a stationary detecting receiver device disposed on a circle. The sender device is positionally fixed on the support, and the circle is parallel to the circular path over which the sender device is rotated. The sender of the sender device is disposed at a distance from the receiver device.

A telemetering apparatus of this type is shown, for instance, in Eur. Patent No. EP-A-0 381 786, where the device is used for computer-aided tomography in medical practice. The sender support is comprised of a support ring or hollow ring which surrounds the patient. A plurality of rotationally fixed sender devices are disposed around said ring. The light emitted by each such sender has a fan-like emission pattern. A circularly disposed receiving device comprising a single detector is provided in the plane of the ring. The distance between the detector and the senders varies, but is generally quite large. However, this known apparatus is costly because it requires a plurality of senders, and is subject to interference and other problems because of the appreciable and varying distance between the senders and the detector.

Other devices are used to send and receive a light beam, wherein the beam is moved along a straight line. The sender device has only one sender for said light beam, and the receiver device is comprised of a fluorescing fiber-optic disposed in a straight line. A detector is located at each of the two ends of the fiber, wherewith the beam emitted from the sender impinges on the fiber-optic fiber at approximately a right angle thereto and the sender is disposed very close to the fiber-optic fiber. This arrangement serves to determine the position of the sender support along the straight fiber-optic fiber, i.e., the position of the sender between the two detectors. Thus, this apparatus also fails to provide interference-free, problem-free, precise transmission of a continuously changing sequence of informational signals from a medical examination apparatus.

SUMMARY OF THE INVENTION

Accordingly, it is a primary object of the present invention to devise an apparatus of the general type described above, but which is less susceptible to interference and other problems, and can be produced at lower cost.

This problem is solved by an apparatus according to the invention by having the sending means comprise only a single sender device for transmitting the informational signals. The receiving device is comprised of a fluorescing fiber-optic fiber which extends in a circular ring configuration and has at least one detector, preferably a PIN photodiode, mounted at or near at least one end of said fiber, for detecting the informational signals. The sender emits the informational signals to the fluorescing fiber-optic fiber at an angle which is approximately perpendicular to the local axis of said fiber.

The fact that the inventive apparatus has only one sender reduces the capital cost. Further, interference and other problems are minimized, because the sender may be disposed very close to the fiber-optic receiver fiber, and because there is a constant distance between the sender and the fiber-optic fiber. These advantages can be achieved by installing the sender and fluorescing fiber-optic fiber on a medical examination apparatus by means, such as a conventional telemetering device. The fluorescing fiber-optic fiber is installed such that it extends in a ring configuration. Said fiber thus is configured to receive and relay information signals.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A preferred embodiment of the invention is illustrated in the accompanying drawings.

FIG. 1 is a front view of the preferred embodiment of an apparatus for sending and receiving rotating light signals;

FIG. 2 is a cross section through line II—II of FIG. 1, shown in a scale which is enlarged with respect to FIG. 1;

FIG. 3 is a cross section through line III—III of FIG. 2;

FIG. 4 is a schematic cross section of a fiber-optic fiber disposed in a channel profile having a partly open enclosure in accord with the preferred embodiment of the invention; and FIG. 5 is a schematic cross section of a fiber-optic fiber disposed in a channel profile having a partly open enclosure in accordance with an alternative preferred embodiment of the invention.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring to the drawings, FIGS. 1 and 2 show the apparatus is provided as part of an examination or research apparatus for CAT (Computer Assisted Tomography). A hollow ring 2 is rotatably mounted in an apparatus housing 1 and serves as a sender support therein. During an examination, ring 2 is rotated continuously at constant speed, in the direction of the arrow 3. The hollow ring 2 extends around an examination table 4 on which the patient being examined (not shown) is positioned.

A sender 5 is disposed laterally on the hollow ring 2, preferably at the top of ring 2, as shown in FIGS. 2 and 3. The sender 5 extends forward in the direction of a center axis 6 and emits a light beam 7 in the axial direction. A frame plate 9 is mounted on the apparatus housing 1 via horizontal struts 8. A fluorescing fiber-optic fiber 10 extending circularly is mounted on plate 9 so as to face the sender 5. One end of fiber 10 is free. The other end delivers the received light signals into a detector 11, which is also mounted on the frame plate 9.

The system generally has a single sender 5 for transmitting the informational signals. The receiving device is comprised of a fluorescing fiber-optic fiber 10 which extends in a circular ring configuration. At least one detector 11, preferably a PIN photodiode, is mounted at or near at least one end of said fiber 10, for detecting the informational signals. The sender 5 emits the informational signals to the fluorescing fiber-optic fiber 10 at an angle which is approximately perpendicular to the local axis of the fiber 10. It is possible to dispose the ring-configured fiber-optic fiber 10 close to the circular path of excursion of the sender, along a circle which is radially inward of or outward of said circular path. In such an arrangement, the sender continuously emits light signals in the radial direction. It is particularly advantageous, however, if the single sender emits in the axial direction with respect to the sender path, and if the ring-configured fiber-optic fiber 10 is disposed close to the circular sender path at a short axial distance from said path. This arrangement of sender path and receiving fiber in two separate planes affords the structural advantage of allowing a lower diameter i.e., a lesser radial thickness of the overall apparatus.

Turning now to FIGS. 4 and 5, it is particularly advantageous if the fiber-optic fiber 10 is disposed in a channel 12 which is open in the direction toward the sender 5 and which has reflecting interior walls 13. Surrounding the fiber-optic fiber 10 substantially by a channel 12 minimizes spurious influences on said fiber. Light is not absorbed in its first transverse pass through the fiber will be reflected and will be passed a second time through the fiber. Such a configuration of the inventive apparatus provides lower attenuation and greater structural flexibility. In addition, the interior surface of the channel may be colored white in order to provide diffuse reflection of the light.

Accordingly, fiber 10 is disposed in a channel 12, the interior walls of which are designated 13. The channel 12 is open upward in the direction toward the sender 5, and in this configuration the fiber 10 is subjected to light emitted by the sender 5. The channel illustrated in FIG. 4 has a sender 5. The channel illustrated in FIG. 4 has a rectangular, or square, profile and has a white-colored interior surface 13. The channel illustrated in FIG. 5 has a parabolic, or elliptical, profile and has an interior surface 13 which is mirrored. Thereby the susceptibility of the apparatus to interferences and other problems is substantially reduced, because the sender may be disposed very close to the receiver (the fiber-optic fiber), and because the distance between the sender and the fiber-optic fiber is constant.

It is particularly advantageous if the interior surface 13 of the channel 12 has a parabolic or elliptic cross-section or profile and a mirrored surface. The interior mirrored channel (or recess) has a cross section which broadens with progression in the direction toward the sender 5. Thus, with progression toward the sender 5, a wider light cone can be deflected onto the fiber-optic fiber 10.

The light beam emitted by the sender need not be directionally disperse, but may be a normal (generally collimated) beam of circular cross section which impinges directly on the fiber-optic fiber 10. The light is received by the fiber-optic fiber 10 without need for an intermediary concentrating means, such as, e.g., lenses. The distance between the sender (i.e., the exit point of the beam) and the fiber-optic fiber 10 is preferably not more than about 15 mm. It is possible to realize the inventive apparatus with a plurality of sender-receiver combinations, wherewith one medical examination apparatus will have two or more individual senders rotating in respective circular paths, each such sender cooperating with its own respective ring-configured fiber-optic fiber 10. In principle, the inventive apparatus is particularly advantageous when the sender support 2 is to be moved over a circular path under circumstances where it is impracticable to provide a rotation axle and/or radial struts for said support since the axle and/or struts tend to occupy the central region of said support path. The apparatus is further advantageous generally in circumstances where it is not possible to direct the informational signals radially to a central axial member and to relay said signals via said member. In the preferred embodiment, the optical sender 5 may comprise, for instance, a standard LED (light-emitting diode).

In the preferred embodiment, the fluorescing fiber-optic fiber 10 is a fiber-optic fiber having a light-conducting core doped with fluorescing dyes. When illuminated with light of sufficient energy, these dyes produce a light which is characteristic of the dye and has a longer wavelength than the light absorbed. The fluorescence light is emitted omnidirectionally, i.e., a certain part of the fluorescence light generated in the core of the fiber reaches the acceptance region of the fiber and is thereby conducted to the ends of the fiber, at which ends it can be detected.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. An apparatus for sending and receiving optical data signals in a medical examination system, the optical data signals representing measurement information, comprising:

a sending device having a single sender for transmitting optical data signals representing measurement information, the sending device disposed at a fixed location on a rotating sender support that rotates along a circular path;

a stationary receiving device disposed at a distance from the sending device, the receiving device comprised of a fluorescing fiberoptic fiber which extends in a circular ring configuration which is parallel to the circular path over which the sending device is rotated to receive optical data signals from the sender; the receiving device further having a stationary detector mounted at or near at least one end of said fiber, for detecting the optical data signals received by the fluorescing fiberoptic fiber; and the sender radiates the optical data signals to the fiberoptic fiber in a direction approximately perpendicular to said fiber.

2. The apparatus according to claim 1, wherein the single sender emits the optical data signals in the axial direction, and the ring-shaped fiberoptic fiber is disposed at an axial distance from and near to the circular path of the sender.

3. The apparatus according to claim 1, wherein the fiberoptic fiber is disposed in a channel which is open in a direction toward the sender and which has a reflecting interior surface.

4. The apparatus according to claim 3, wherein the interior surface of the channel has a parabolic cross section and mirrored surface.

5. The apparatus according to claim 3, wherein the interior surface of the channel has an elliptic cross section and a mirrored surface.

6. An apparatus for sending and receiving optical signals that represent measurement information in a medical examination system, comprising:

a single sender for transmitting optical data signals representing measurement information, the sender disposed at a fixed location on a rotating sender support that rotates along a circular path;

a stationary fiberoptic fiber comprising a fluorescing fiber, the fluorescing fiberoptic fiber disposed at a distance from the sender in a circular ring configuration which is parallel to the circular path over which the sender is rotated to receive the optical data signals transmitted by the sender, wherein the sender radiates the optical data signals to the fiberoptic fiber in a direction approximately perpendicular to said fluorescing fiberoptic fiber; and, a stationary detector mounted at or near at least one end of said fluorescing fiberoptic fiber, for detecting the optical data signals received by the fluorescing fiberoptic fiber.

7. The apparatus according to claim 6, wherein the single sender emits the optical data signals in the axial direction, and the ring-shaped fiberoptic fiber is disposed at an axial distance from and near to the circular path of the sender.

8. The apparatus according to claim 6, wherein the fiberoptic fiber is disposed in a channel which is open in a direction toward the sender and which has a reflecting interior surface.

9. The apparatus according to claim 8, wherein the interior surface of the channel has a parabolic cross section and mirrored surface.

10. The apparatus according to claim 8, wherein the interior surface of the channel has an elliptic cross section and a mirrored surface.

11. The apparatus of claim 6, wherein fluorescence of the fluorescing fiberoptic fiber is generated by the optical data signals.

12. The apparatus of claim 6, wherein optical data signals received by the fluorescing fiberoptic fiber are converted to fluorescent light and propagated along the fluorescing fiberoptic fiber, and the stationary detector detects the fluorescent light as the optical data signals.

* * * * *